United States Patent
Jacob et al.

(10) Patent No.: US 11,474,123 B2
(45) Date of Patent: Oct. 18, 2022

(54) PITOT TUBE INCLUDING A TUBE SLEEVE HAVING A REDUCED DIAMETER TO ACCOMMODATE A HEATING ELEMENT

(71) Applicant: Goodrich Corporation, Charlotte, NC (US)

(72) Inventors: Robin Jacob, Bangalore (IN); Guru Prasad Mahapatra, Karnataka (IN); Paul Robert Johnson, Prior Lake, MN (US)

(73) Assignee: ROSEMOUNT AEROSPACE INC., Burnsville, MN (US)

( * ) Notice: Subject to any disclaimer, the term of this patent is extended or adjusted under 35 U.S.C. 154(b) by 138 days.

(21) Appl. No.: 16/739,750

(22) Filed: Jan. 10, 2020

(65) Prior Publication Data
US 2020/0233007 A1 Jul. 23, 2020

(30) Foreign Application Priority Data
Jan. 17, 2019 (IN) .............................. 201911002095

(51) Int. Cl.
*G01P 5/16* (2006.01)
*G01P 5/165* (2006.01)
(52) U.S. Cl.
CPC .................................... *G01P 5/165* (2013.01)
(58) Field of Classification Search
None
See application file for complete search history.

(56) References Cited

U.S. PATENT DOCUMENTS

| | | | |
|---|---|---|---|
| 4,836,019 A * | 6/1989 | Hagen | G01P 5/165 73/180 |
| 5,046,360 A | 9/1991 | Hedberg | |
| 5,337,602 A | 8/1994 | Gibson | |
| 6,813,942 B1 | 11/2004 | Vozhdaev et al. | |
| 6,901,814 B2 | 6/2005 | Vozhdaev et al. | |
| 7,543,759 B2 | 6/2009 | George | |
| 9,207,253 B2 | 12/2015 | Seidel et al. | |
| 9,664,542 B2 | 5/2017 | Gordon et al. | |
| 9,791,304 B2 | 10/2017 | Wong et al. | |
| 9,856,027 B2 | 1/2018 | Anderson et al. | |
| 9,891,083 B2 | 2/2018 | Gordon et al. | |

(Continued)

FOREIGN PATENT DOCUMENTS

EP 3190419 A1 7/2017

OTHER PUBLICATIONS

European Search Report for European Application No. 20152036.8; dated 22 Jun. 6, 2020; 10 pages.

*Primary Examiner* — Harshad R Patel
(74) *Attorney, Agent, or Firm* — Cantor Colburn LLP

(57) ABSTRACT

A pitot tube includes an outer tube extending from a first tube end to second tube end, the second tube end defining a tip portion of the pitot tube, the tip portion including an inlet opening. A tube sleeve inside of the outer tube at least partially defines a tube passage extending from the first tube end to the second tube end. The tube sleeve includes a sleeve outer surface having a sleeve body portion having a first outer diameter and a sleeve tip portion located at the tip portion of the pitot tube. The sleeve tip portion has a second outer diameter smaller than the first outer diameter. A heating element is located between the outer tube and the tube sleeve at at least the sleeve tip portion.

19 Claims, 3 Drawing Sheets

(56) References Cited

U.S. PATENT DOCUMENTS

| | | | |
|---|---|---|---|
| 9,975,639 B2 | 5/2018 | Hodot et al. | |
| 2013/0145862 A1* | 6/2013 | Leblond | G01P 5/10 |
| | | | 73/861.68 |
| 2016/0280391 A1* | 9/2016 | Golly | B64D 43/02 |
| 2016/0302259 A1 | 10/2016 | Sarno et al. | |
| 2016/0304210 A1* | 10/2016 | Wentland | G01P 13/025 |
| 2017/0101190 A1* | 4/2017 | Anderson | H05B 3/56 |
| 2018/0259548 A1* | 9/2018 | Anderson | G01P 5/165 |
| 2020/0087769 A1* | 3/2020 | Jacob | B23K 26/14 |
| 2021/0333099 A1* | 10/2021 | Zhu | G01P 5/16 |

\* cited by examiner

PITOT TUBE INCLUDING A TUBE SLEEVE HAVING A REDUCED DIAMETER TO ACCOMMODATE A HEATING ELEMENT

FOREIGN PRIORITY

This application claims priority to India Patent Application No. 201911002095, filed Jan. 17, 2019, and all the benefits accruing therefrom under 35 U.S.C. § 119, the contents of which in its entirety are herein incorporated by reference.

BACKGROUND

Exemplary embodiments pertain to the art of aircraft sensors such as pitot tubes, and more particularly to aerodynamic performance and ice protection of pitot tubes.

A pitot tube is widely used to determine airspeed of an aircraft or other vehicle, or to measure air or gas velocities in industrial applications. In particular, by measuring stagnation pressure of a fluid driven into the pitot tube, together with a measured static pressure, the airspeed of the aircraft can be determined. In certain flight conditions, the pitot tube may be subject to ice accumulation from moisture in the air. For this reason, pitot tubes are equipped with heating elements to prevent such ice accumulation. Further, in other conditions, the pitot tube may ingest ice crystals which then accumulate inside of the pitot tube and cause failure in its operation. A typical pitot tube is substantially cylindrical with an internal diameter containing the heating elements, or coils to prevent ice accumulation.

From wind tunnel experiment it is found that by increasing the pitot tube length and modifying the outside profile of the pitot tube tip, aerodynamic performance of the pitot tube can be improved. Such modifications can, however, have a negative effect on ice accumulation prevention in the pitot tube.

BRIEF DESCRIPTION

In one embodiment, a pitot tube includes an outer tube extending from a first tube end to second tube end, the second tube end defining a tip portion of the pitot tube, the tip portion including an inlet opening. A tube sleeve inside of the outer tube at least partially defines a tube passage extending from the first tube end to the second tube end. The tube sleeve includes a sleeve outer surface having a sleeve body portion having a first outer diameter and a sleeve tip portion located at the tip portion of the pitot tube. The sleeve tip portion has a second outer diameter smaller than the first outer diameter. A heating element is located between the outer tube and the tube sleeve at at least the sleeve tip portion.

Additionally or alternatively, in this or other embodiments the heating element is located at both of the sleeve tip portion and the sleeve body portion.

Additionally or alternatively, in this or other embodiments the heating element is one or more heater coils wrapped around the tube sleeve.

Additionally or alternatively, in this or other embodiments the tube sleeve includes one or more sleeve grooves in the sleeve outer surface to accommodate the heater coils.

Additionally or alternatively, in this or other embodiments the tube passage includes a passage throat portion extending from the inlet opening, and a passage body portion extending from the passage throat portion opposite the inlet opening. The throat portion has a smaller throat opening diameter than a body opening diameter of the passage body portion.

Additionally or alternatively, in this or other embodiments the tip portion of the pitot tube converges from an inlet opening diameter at the inlet opening toward the passage throat portion.

Additionally or alternatively, in this or other embodiments the throat opening diameter is less than the inlet opening diameter.

Additionally or alternatively, in this or other embodiments one or more water dams extend from the tube sleeve into the tube passage.

Additionally or alternatively, in this or other embodiments one or more drain openings extend from the tube passage through the tube sleeve and through the outer tube.

Additionally or alternatively, in this or other embodiments the tube sleeve is secured to the outer tube via one of brazing or laser metal deposition.

In another embodiment, a method of forming a pitot tube includes forming a tube sleeve, the tube sleeve defining a tube passage and including a sleeve outer surface having a sleeve body portion having a first outer diameter, and a sleeve tip portion located at a tip portion of the pitot tube. The sleeve tip portion has a second outer diameter smaller than the first outer diameter. The tube passage includes a throat portion extending from a first end of the tube sleeve, and a body portion extending from the throat portion to a second end of the tube sleeve. The throat portion has a smaller throat opening diameter than a body opening diameter of the body portion. A heating element is installed at at least the sleeve tip portion of the tube sleeve. The tube sleeve is secured in an outer tube such that the heating element is between the tube sleeve and the outer tube.

Additionally or alternatively, in this or other embodiments installing the heating element to the tube sleeve includes forming one or more sleeve grooves in the outer surface of the tube sleeve, and installing the heating element in the one or more grooves.

Additionally or alternatively, in this or other embodiments the heating element is a heater coil.

Additionally or alternatively, in this or other embodiments the heating element is installed at both the sleeve tip portion and the sleeve body portion.

Additionally or alternatively, in this or other embodiments the tube passage includes a passage throat portion extending from an inlet opening, and a passage body portion extending from the passage throat portion opposite the inlet opening, the throat portion having a smaller throat opening diameter than a body opening diameter of the passage body portion.

Additionally or alternatively, in this or other embodiments a converging portion is formed in the outer tube from an inlet opening diameter at the inlet opening toward the passage throat portion.

Additionally or alternatively, in this or other embodiments the throat opening diameter is less than the inlet opening diameter.

Additionally or alternatively, in this or other embodiments one or more water dams extend from the tube sleeve into the tube passage.

Additionally or alternatively, in this or other embodiments one or more drain openings extend from the tube passage through the tube sleeve and through the outer tube.

Additionally or alternatively, in this or other embodiments the tube sleeve is secured to the outer tube via one of brazing or laser metal deposition.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
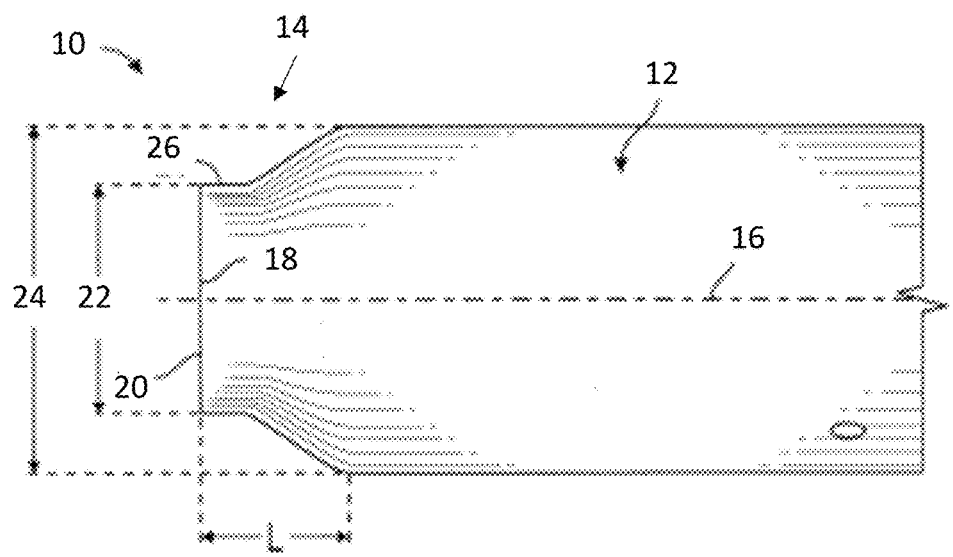
FIG. 1 is a perspective view of an embodiment of a pitot tube.

Referring to FIG. 1, illustrated is a plan view of an embodiment of a sensor, in this embodiment a pitot tube 10. The pitot tube 10 includes a cylindrical body portion 12 and a tip portion 14 extending along a tube axis 16 from the body portion 12 toward a tube inlet 18. In the embodiment of FIG. 1, the tip portion 14 includes an inlet opening 20 having an inlet diameter 22 smaller than a body diameter 24 of the body portion 12. The tip portion 14, between the body portion 12 and the inlet opening 20, tapers in diameter along a taper portion 26. In some embodiments, the taper is linear, while in other embodiments the taper is along a concave curve. In some embodiments, the taper portion 26 does not extend entirely to the inlet opening 20 as the inlet diameter 22 extends axially from the inlet opening 20 to the taper portion 26. It shall be understood that the taper portion 26 may be straight or a profile that is aerodynamically suitable in one embodiment.

As shown, the tip portion 14 has a tip length L. The length of the tip may be limited by an ability of a heating element or coils disposed inside the tip to provide heat to it. That is, if the tip is too long, the heater may not be able to heat a distal end thereof such that ice does not form or otherwise accumulate in or on the tip portion 14.

Figure 2:
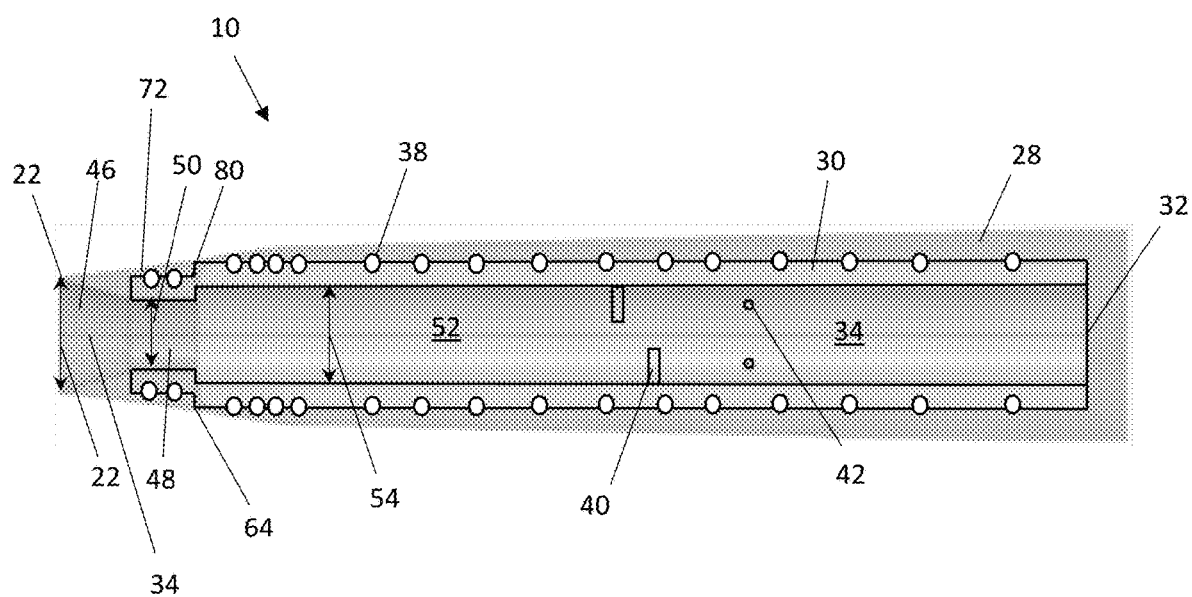
FIG. 2 is a cross-sectional view of an embodiment of a pitot tube.

Referring now to FIG. 2, the pitot tube 10 includes an outer tube 28, a tube sleeve 30 disposed inside of the outer tube 28, and a heating element, for example a heater coil 38, disposed radially between the tube sleeve 30 and the outer tube 28. The tube sleeve 30 extends along an interior of the pitot tube 10 to a tube end 32, defining a tube passage 34 from a tip portion 14 of the pitot tube 10 to the tube end 32. The pitot tube 10 further includes one or more water dams 40 extending inwardly from the tube sleeve 30 into the tube passage 34 and one or more drain openings 42 extending from the tube passage 34, through the tube sleeve 30 and the outer tube 28 to allow for egress of water from the pitot tube 10.

The tube passage 34 includes an opening diameter 22 at the inlet opening 20 and converging section 46 extending from the inlet opening 20 to a throat portion 48. The tube passage 34 radially narrows from the inlet opening 20 to the throat portion 48 such that a throat diameter 50 of the throat portion 48 is smaller than the opening diameter 22. From the throat portion 48, the tube passage 34 radially widens at a body portion 52 of the tube passage 34. A body diameter 54 of the body portion 52 is greater than the throat diameter 50.

Figure 3:
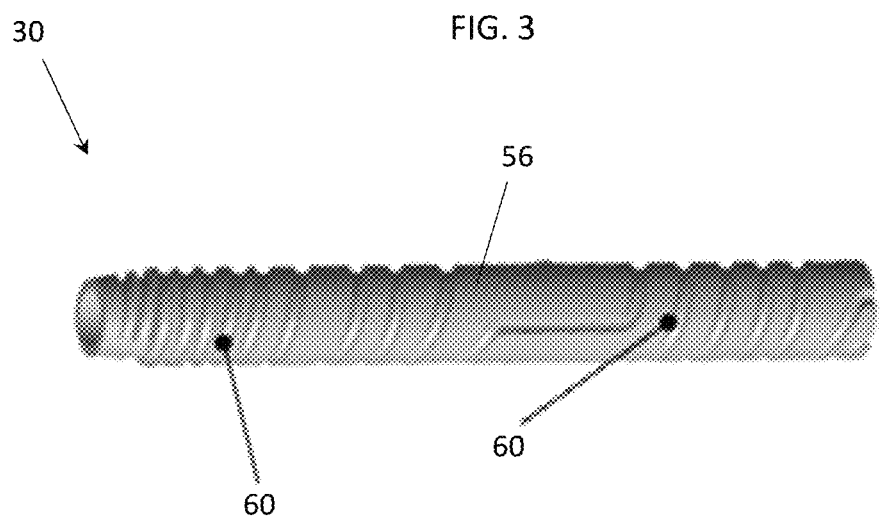
FIG. 3 is a perspective view of an embodiment of a tube sleeve for a pitot tube.
Figure 4:
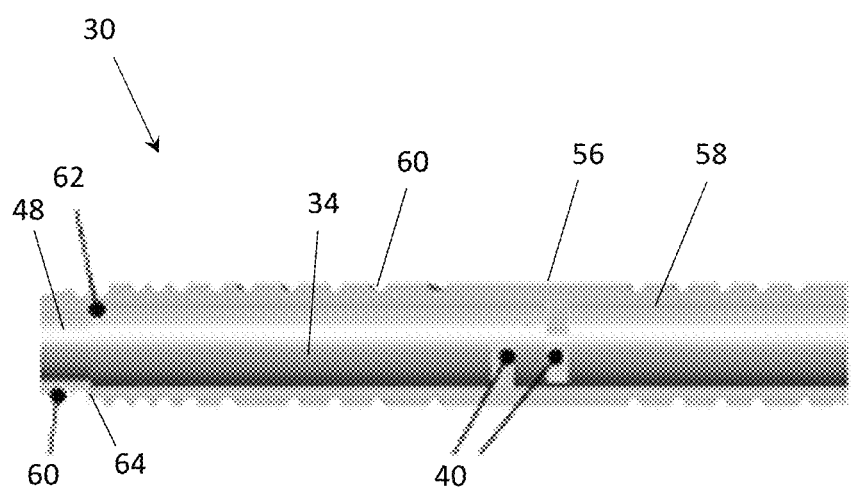
FIG. 4 is a cross-sectional view of an embodiment of a tube sleeve of a pitot tube.

Referring to FIGS. 3 and 4, the tube sleeve 30 includes a sleeve outer surface 56 and a sleeve inner surface 58. The sleeve inner surface 58 defines the tube passage 34 and the one or more water dams 40 extend from the sleeve inner surface 58 into the tube passage 34. The tube sleeve 30 further includes one or more sleeve grooves 60 formed in the sleeve outer surface 56 to receive the heater coil 38. Further, the tube sleeve 30 defines the throat portion 48, through inclusion of an inner surface step 62 in the sleeve inner surface 58 at which the tube passage 34 narrows from the body portion 52 to the throat portion 48. Further, the sleeve outer surface 56 includes an outer surface step 64 so the tube sleeve 30 can be received in the outer tube 28 and extend along a tapered portion 72 (see FIG. 2) of the outer tube 28 near the inlet opening 20. The sleeve body portion 52 has a first outer diameter, and a sleeve tip portion 80 at the tip portion of the pitot tube 10 has a second outer diameter smaller than the first outer diameter.

Figure 5:
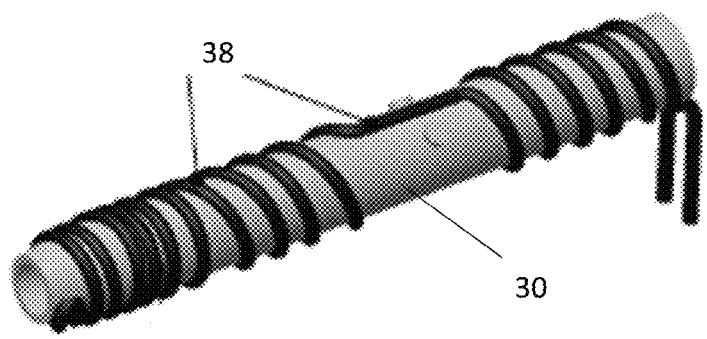
FIG. 5 is a perspective view illustrating a heater coil wound onto a tube sleeve.

Referring now to FIG. 5, the heater coil 38 is wound onto the tube sleeve 30 by inserting the heater coil 38 into the sleeve grooves 60, as shown. Once the heater coil 38 is installed onto the tube sleeve 30, the tube sleeve 30 including the heater coil 38 is installed into the outer tube 28 and secured therein by, for example, brazing or laser metal deposition.

With the tube sleeve 30 providing the throat portion 48 of the tube passage 34, and the tube sleeve including the inner surface step 62 and outer surface step 64, the tube sleeve 30 extends closer to the inlet opening 20 than in a typical pitot tube configuration. Further, this configuration allows the heater coil 38 to extend closer to the inlet opening 20 than in a typical pitot tube configuration thereby providing improved heating to the tip portion 14 and improving ice prevention and removal performance of the pitot tube 10. Thus in addition to the improved ice protection, with the heater coils closer to the tip, the tip length could be further increased than a typical pitot tube to enhance the aerodynamic performance of the pitot tube.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A pitot tube, comprising:
   an outer tube extending from a first tube end to second tube end, the second tube end defining a tip portion of the pitot tube, the tip portion including an inlet opening;
   a tube sleeve inside of the outer tube at least partially defining a tube passage extending from the first tube end to the second tube end, the tube sleeve including a sleeve outer surface having:
      a sleeve body portion having a first outer diameter and a first inner diameter;
      a sleeve tip portion disposed at the tip portion of the pitot tube, the sleeve tip portion having a second outer diameter smaller than the first outer diameter and a second inner diameter smaller than the first inner diameter; and
      a sleeve radial step connecting the first inner diameter and the second inner diameter; and
   a heating element between the outer tube and the tube sleeve at at least the sleeve tip portion;
   wherein the tube passage is defined by the first inner diameter, the sleeve radial step and the second inner diameter.

2. The pitot tube of claim 1, wherein the heating element is disposed at both of the sleeve tip portion and the sleeve body portion.

3. The pitot tube of claim 1, wherein the heating element is one or more heater coils wrapped around the tube sleeve.

4. The pitot tube of claim 3, wherein the tube sleeve includes one or more sleeve grooves in the sleeve outer surface to accommodate the heater coils.

5. The pitot tube of claim 1, wherein the tip portion of the pitot tube converges from an inlet opening diameter at the inlet opening toward the passage throat portion.

6. The pitot tube of claim 5, wherein the throat opening diameter is less than the inlet opening diameter.

7. The pitot tube of claim 1, further comprising one or more water dams extending from the tube sleeve into the tube passage.

8. The pitot tube of claim 1, further comprising one or more drain openings extending from the tube passage through the tube sleeve and through the outer tube.

9. The pitot tube of claim 1, wherein the tube sleeve is secured to the outer tube via one of brazing or laser metal deposition.

10. A method of forming a pitot tube, comprising:
    forming a tube sleeve, the tube sleeve defining a tube passage and including a sleeve outer surface having:
       a sleeve body portion having a first outer diameter and a first inner diameter;
       a sleeve tip portion disposed at a tip portion of the pitot tube, the sleeve tip portion having a second outer diameter smaller than the first outer diameter and a second inner diameter smaller than the first inner diameter; and
       a sleeve radial step connecting the first inner diameter and the second inner diameter; and
    the tube passage is defined by the first inner diameter, the sleeve radial step and the second inner
    installing a heating element at at least the sleeve tip portion of the tube sleeve; and
    securing the tube sleeve in an outer tube such that the heating element is between the tube sleeve and the outer tube.

11. The method of claim 10, wherein installing the heating element to the tube sleeve comprises:
    forming one or more sleeve grooves in the outer surface of the tube sleeve; and
    installing the heating element in the one or more grooves.

12. The method of claim 10, wherein the heating element is a heater coil.

13. The method of claim 10, further comprising installing the heating element at both the sleeve tip portion and the sleeve body portion.

14. The method of claim 10, wherein the tube passage includes:
    a passage throat portion extending from an inlet opening; and
    a passage body portion extending from the passage throat portion opposite the inlet opening, the throat portion having a smaller throat opening diameter than a body opening diameter of the passage body portion.

15. The method of claim 14, further comprising forming a converging portion in the outer tube from an inlet opening diameter at the inlet opening toward the passage throat portion.

16. The method of claim 15, wherein the throat opening diameter is less than the inlet opening diameter.

17. The method of claim 10, further comprising one or more water dams extending from the tube sleeve into the tube passage.

18. The method of claim 10, further comprising one or more drain openings extending from the tube passage through the tube sleeve and through the outer tube.

19. The method of claim 10, further comprising securing the tube sleeve to the outer tube via one of brazing or laser metal deposition.

* * * * *